(12) United States Patent
Lai

(10) Patent No.: US 7,899,076 B2
(45) Date of Patent: Mar. 1, 2011

(54) NETWORK DEVICE AND WORKING MODE SWITCHING METHOD

(75) Inventor: Chi-Chao Lai, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 245 days.

(21) Appl. No.: 12/195,379

(22) Filed: Aug. 20, 2008

(65) Prior Publication Data
US 2009/0268729 A1    Oct. 29, 2009

(30) Foreign Application Priority Data
Apr. 28, 2008  (CN) .......................... 2008 1 0301345

(51) Int. Cl.
*H04L 12/42* (2006.01)
(52) U.S. Cl. ..................... 370/459; 370/311; 370/401
(58) Field of Classification Search .............. 370/465, 370/459, 311, 401
See application file for complete search history.

(56) References Cited

U.S. PATENT DOCUMENTS

| | | | |
|---|---|---|---|
| 6,108,545 A * | 8/2000 | Keshavachar | 455/436 |
| 6,311,081 B1 * | 10/2001 | Northcutt et al. | 455/574 |
| 6,331,971 B1 * | 12/2001 | Raith | 370/311 |
| 6,445,730 B1 * | 9/2002 | Greszczuk et al. | 375/219 |
| 6,952,417 B1 * | 10/2005 | Posthuma | 370/360 |
| 7,085,283 B1 * | 8/2006 | Liu et al. | 370/459 |
| 7,149,243 B2 * | 12/2006 | Porat et al. | 375/222 |
| 7,421,597 B2 * | 9/2008 | Kardach et al. | 713/300 |
| 7,505,795 B1 * | 3/2009 | Lim et al. | 455/574 |

FOREIGN PATENT DOCUMENTS

CN    1728654 A    2/2006

\* cited by examiner

*Primary Examiner* — Ricky Ngo
*Assistant Examiner* — Dewanda Samuel
(74) *Attorney, Agent, or Firm* — Frank R. Niranjan

(57) ABSTRACT

A network device includes a timing module, a traffic analysis module, a counting module, a mode switching module and at least one processor. The timing module sets a plurality of continual timing periods each including a plurality of timing periods. The traffic analysis module analyzes if the traffic transmitted by the network device in each of the timing periods in a continual timing period is less than a predetermined traffic threshold, and defining a first analysis result every time that the traffic transmitted through the network device in each of the timing periods in the continual timing period is less than the predetermined traffic threshold. The counting module counts an amount of the first analysis results, and determines if the counted amount is less than a predetermined threshold. The mode switching module switches the working mode of the network device according to the determination of the counting module.

9 Claims, 3 Drawing Sheets

NETWORK DEVICE AND WORKING MODE SWITCHING METHOD

BACKGROUND OF THE INVENTION

1. Field of the Invention

Embodiments of the present disclosure relate to network communications, and especially to a network device and working mode switching method.

2. Description of related art

With the continued development of network communications, Asymmetric Digital Subscriber Line (ADSL) devices, such as ADSL Transceiver Remote-Terminal (ATU-R) and ADSL Transceiver Unit-Central Office (ATU-C), are widely used. Normally, in an ADSL communication system, the ATU-R is placed in a terminal family, while the ATU-C is placed on the side of a network service provider. Thus, the family user can obtain services provided by the network service provider by exchanging data packets between the ATU-R and the ATU-C.

The International Telecommunication Union (ITU-T) has established ADSL device power management standards, such as ITU-T G992.3/G992.5, to regulate signal receipt and transmission within different working modes, such as a normal working mode, a low power mode, and a sleep mode for ADSL devices. Under the ITU-T standards, the ADSL device operating in the sleep mode may not transmit data packets with electrical energy consumption of more than approximately 0.3 watts per line. When the ADSL device is operating in the normal working mode, significantly more data packets can be transmitted, and as a result, the electrical energy consumption of the ADSL device is approximately 1.5 watts per line. When the ADSL device is operating in the low power mode, fewer data packets are transmitted, and as a result, the electrical energy consumption of the ADSL device is approximately 0.75 watts per line.

Normally, family users are able to turn off a computer that is connected to the ADSL device, but they may not turn off the ADSL device in a timely manner. Therefore, the ADSL device does not exit the normal working mode and into the sleep mode in a timely manner, which leads to a higher level of electrical energy consumed by the ADSL device.

Therefore, a heretofore unaddressed need exists in the industry to address the aforementioned deficiencies and inadequacies.

SUMMARY

A network device includes a timing module, a traffic analysis module, a counting module, a mode switching module and at least one processor. The timing module sets a plurality of continual timing periods. Each of the continual timing periods includes a plurality of timing periods. The traffic analysis module analyzes if the traffic transmitted by the network device in each of the timing periods in a continual timing period is less than a predetermined traffic threshold, and defining a first analysis result every time that the traffic transmitted through the network device in each of the timing periods in the continual timing period is less than the predetermined traffic threshold. The counting module counts an amount of the first analysis results defined by the traffic analysis module, and determines if the counted amount is less than a predetermined threshold. The mode switching module switches the working mode of the network device according to the determination of the counting module. The processor executes the timing module, the traffic analysis module, the counting module, and the mode switching module.

DETAILED DESCRIPTION OF CERTAIN INVENTIVE EMBODIMENTS

Figure 1:
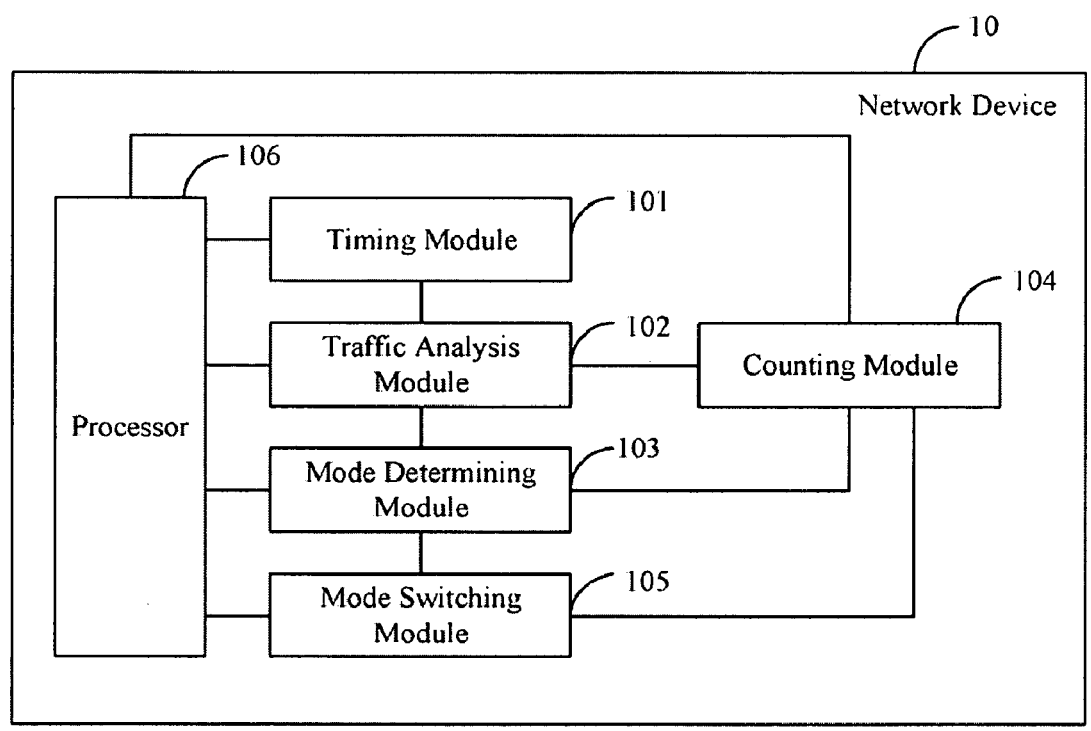
FIG. 1 is a block module of a network device of one embodiment of the present disclosure.

FIG. 1 is a block module of a network device 10 of one embodiment of the present disclosure. In one exemplary embodiment, the network device 10 can be operating in a normal working mode or a sleep mode. The normal working mode indicates the network device 10 transmits data packets with other devices (not shown) causing the electrical energy consumption of the network device to be approximately 1.5 watts per line in one particular embodiment. The sleep mode indicates the network device 10 does not transmit data packets with other devices (not shown) and the power thereof has not been turned off in a timely manner, thus, the electrical energy consumption of the network device 10 may be approximately 0.3 watts per line.

In one embodiment, the network device 10 may be an Asymmetric Digital Subscriber Line (ADSL), such as an ADSL Transceiver Remote-Terminal (ATU-R) or an ADSL Transceiver Unit-Central Office (ATU-C). The working modes of the network device 10 can be switched based on traffic transmitted in order to save the electrical energy.

In one embodiment, the network device 10 comprises a timing module 101, a traffic analysis module 102, a mode determining module 103, a counting module 104, and a mode switching module 105. The network device 10 comprises one or more general purpose or specialized processors, such as a processor 106 for executing the timing module 101, the traffic analysis module 102, the mode determining module 103, the counting module 104, and the mode switching module 105.

The timing module 101 is configured for setting a plurality of continual timing periods for the network device 10. Each of the continual timing periods comprises a plurality of timing periods. The timing periods are set according to capability of the network device 10 and status of a network, which can be modified. In one exemplary embodiment, each of the timing periods may be approximately 3 seconds.

The traffic analysis module 102 is configured for analyzing if traffic transmitted through the network device 10 in each of the timing periods in a continual timing period is less than a predetermined traffic threshold defined as a first analysis result. If the traffic transmitted through the network device 10 in each of the timing periods in the continual timing period is less than the predetermined traffic threshold, the traffic analysis module 102 notifies the counting module 104 of the first analysis result. If the traffic transmitted through the network device 10 in each of the timing periods in the continual timing period is not less than the predetermined traffic threshold, which is defined as a second analysis result, the traffic analysis module 102 also notifies the counting module 104 of the second analysis result. Additionally, the traffic analysis module 102 can reset the traffic transmitted through the network device 10 at the end of each timing period.

The mode determining module 103 is configured for determining working modes of the network device 10. In one exemplary embodiment, if the traffic transmitted through the network device 10 is less than the predetermined traffic threshold, the mode determining module 103 determines if the network device 10 is in the sleep mode according to the electrical energy consumption currently. If the traffic transmitted through the network device 10 is not less than the predetermined traffic threshold, the mode determining module 103 determines if the network device 10 is operating in the normal working mode according to the electrical energy consumption currently.

The counting module 104 is configured for setting a traffic estimation amount according to the analysis results of the traffic analysis module 102. In one exemplary embodiment, the traffic estimation amount indicates that an amount of the traffic transmitted through the network device 10 in each of timing periods in the continual timing period is less than the predetermined traffic threshold, and the traffic estimation amount is initialized to 0. The counting module 104 is also further configured for determining if the counted amount is less than a predetermined threshold. Specifically, when the traffic transmitted through the network device 10 is less than the predetermined traffic threshold in any one timing period in the continual timing period, the traffic analysis module 102 notifies the counting module 104 of the first analysis result. Thus, the counting module 104 increments the traffic estimation amount by one. If the mode determining module 103 determines that the network device 10 is not operating in the sleep mode, the counting module 104 compares the counted amount to the predetermined threshold. If the counted amount is not less the predetermined threshold, the counting module 104 resets the counted amount to zero.

The mode switching module 105 is configured for switching the working modes of the network device 10 based on the analysis results of the traffic analysis module 102. The working modes of the network device 10 is determined by the mode determining module 103 and the counted amount of the counting module 104. When the counting module 104 determines that the counted amount is not less than the predetermined threshold and the mode determining module 103 determines that the network device 10 is not operating in the sleep mode, the mode switching module 105 switches the network device 10 to sleep mode. When the traffic analysis module 102 determines that the traffic transmitted through the network device 10 in each of timing periods in the continual timing period is not less than the predetermined traffic threshold and the mode determining module 103 determines that the network device 10 is not operating in the normal working mode, the mode switching module 105 switches the network device 10 to the normal working mode.

Figure 2:
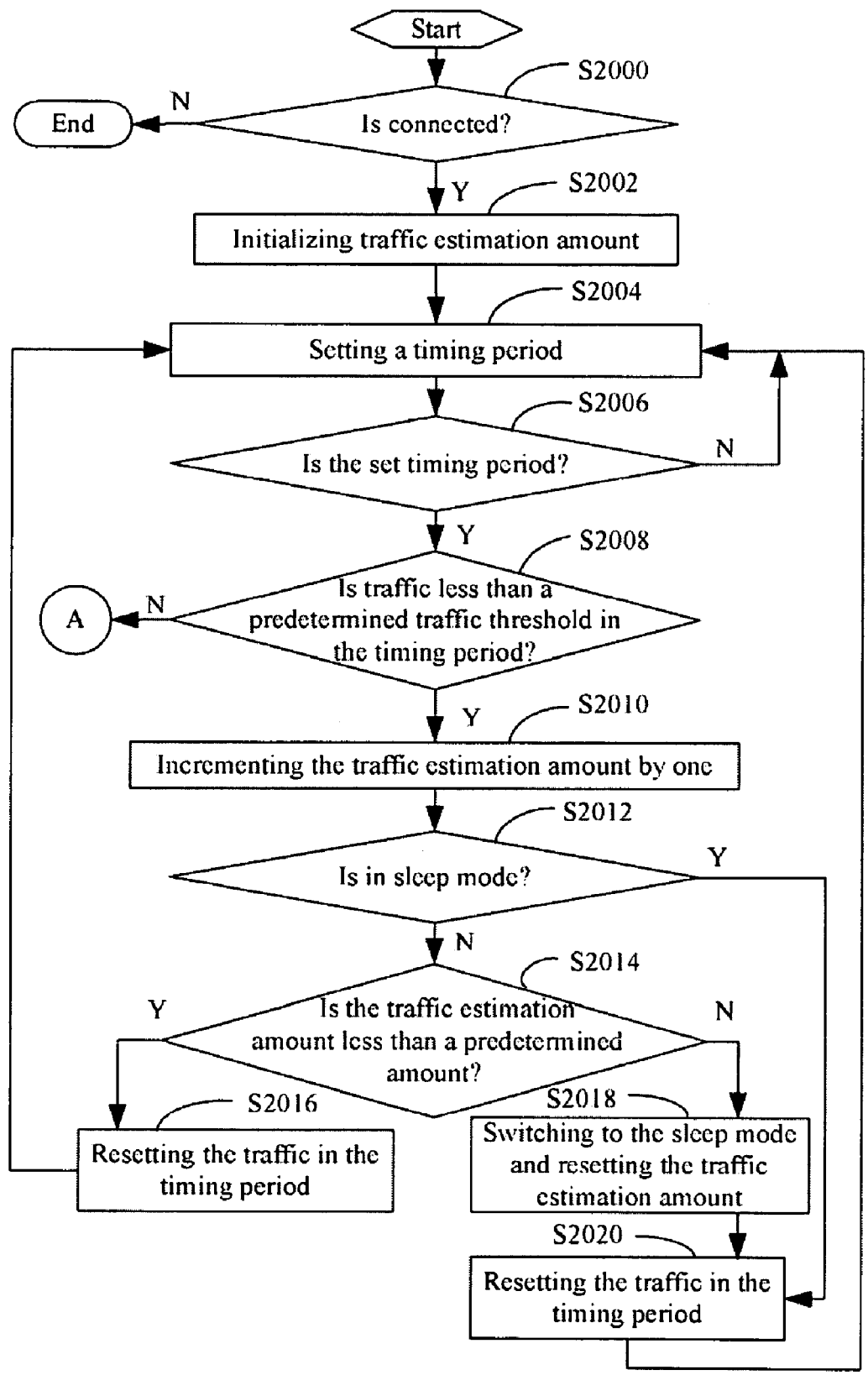
FIG. 2 and FIG. 3 are flow charts of a method for switching working modes of an one embodiment of the present disclosure.
Figure 3:
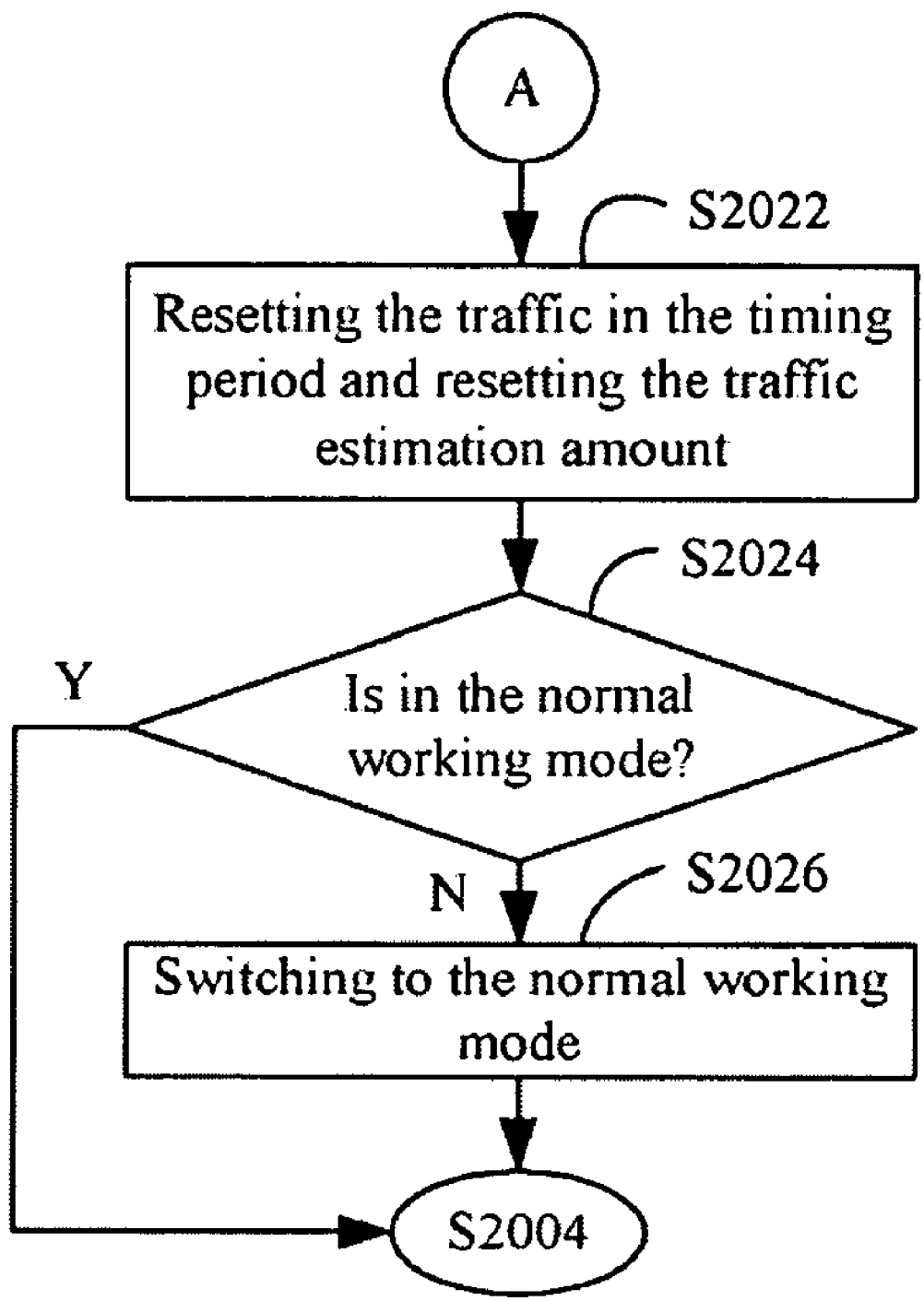

FIG. 2 is a flowchart of a method for switching working modes of one embodiment of the present disclosure. In block S2000, the mode determining module 103 determines if the network device 10 is connected to a remote device and is operating in ADSL/ADSL2+ status. If the network device 10 is not connected to the remote device and operating in ADSL/ADSL2+ status, the procedure ends. In one exemplary embodiment, once connected to the remote device, the network device 10 is operating in the normal working mode.

If the network device 10 is connected to the remote device and operating in ADSL/ADSL2+ status, in block S2002, the counting module 104 initializes the traffic estimation amount indicating that the amount of the traffic transmitted through the network device is less than the predetermined traffic threshold in each of timing periods in one continual timing period.

In block S2004, the timing module 101 sets a timing period for the network device 10. As mentioned above, the timing periods are set according to capability of the network device 10 and status of a network, which can be modified. In one exemplary embodiment, the timing period is 3 seconds. It may be understood that the timing period may vary depending on the situation and different embodiments of the present disclosure.

In block S2006, the counting module 101 determines if the timing period used by the network device 10 is the set timing period. If the timing period used is not the set timing period, block S2004 is executed.

In one exemplary embodiment, based on ADSL device power management standards of International Telecommunication Union (ITU-T), such as ITU-T G992.3/G992.5, the working mode of the network device 10 can be estimated by the traffic transmitted through the network device 10. Moreover, according to the ITU-G992.3/G992.5, the traffic is approximately 0 when the network device 10 is in sleep mode.

If the timing period presently used is the set timing period, in block S2008, the traffic analysis module 102 analyzes if the traffic transmitted through the network device 10 is less than the predetermined traffic threshold in the timing period. The predetermined traffic threshold is set based on the capability of the network device 10 and status of the network. For example, if the predetermined traffic threshold is set to 2 data packets, wherein one data packet is 48 bits, the predetermined traffic threshold is 96 bits. In another embodiment of the present disclosure, the predetermined traffic threshold is set based on the quantity of the data packets and size of each data packet. In one exemplary embodiment, block S2008 is performed at the end of the timing period.

In one exemplary embodiment, if the traffic transmitted through the network device 10 is greater than 96 bits in the timing period, block S2022 is executed.

If the traffic transmitted through the network device 10 is less than 96 bits in the timing period, in block S2010, the counting module 104 increments the traffic estimation amount by one.

In block S2012, the mode determining module 103 determines if the network device 10 is in the sleep mode in the timing period according to the electrical energy consumption currently. In one exemplary embodiment, the network device 10 is estimated in the sleep mode based on the determination of block S2008.

If the network device 10 is not in the sleep mode, in block S2014, the counting module 104 determines if the traffic estimation amount is less the predetermined threshold. In one exemplary embodiment, the predetermined threshold may be approximately 5.

If the network device 10 is not in the sleep mode, and the traffic estimation amount is not less 5, the network device 10 may be switched to the sleep mode. Therefore, in block S2018, the network device 10 is switched to the sleep mode, and the counting module 104 resets the traffic estimation amount to zero. Then, block S2020 is executed, where the traffic analysis module 102 resets the traffic transmitted through the network device 10 in the timing period.

If the network device 10 is not in the sleep mode, and the traffic estimation amount is less than 5, the network device 10 is not switched to the sleep mode, and as a result, in block S2016, the traffic analysis module 102 resets the traffic transmitted through the network device 10 in the timing period, and block S2004 is executed.

In block S2008, if the traffic transmitted through the network device 10 is not less than 96 bits in one timing period, in block S2022, the traffic analysis module 102 resets the traffic transmitted through the network device 10 in the timing period, and resets the traffic estimation amount.

In block S2024, the mode determining module 103 determines if the network device 10 is operating in the normal working mode.

If the network device 10 is not operating in the normal working mode, in block S2026, the mode switching module 105 switches the network device 10 to the normal working mode. Then, block S2004 is executed, the counting module 101 sets the timing period.

In the present disclosure, the method for switching working modes is performed via determining if the traffic transmitted through the network device 10 is less than the predetermined traffic threshold in each of timing periods in one continual timing period, and determining if the amount of the traffic in each of timing periods in a continual timing period is less than the predetermined traffic threshold. If the traffic transmitted through the network device 10 is less than the predetermined threshold, the network device 10 is switched to the sleep mode.

Additionally, a timing period can be set, and the blocks of the method can be cycled for multiple continual timing periods, thereby regulating the working modes of the network device 10. As a result, electrical energy of the network device 10 is saved.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A network device capable of switching working modes according to traffic transmitted through the network device, the network device comprising:
   a timing module configured for setting a plurality of continual timing periods, wherein each of the continual timing periods comprises a plurality of timing periods;
   a traffic analysis module configured for analyzing if the traffic transmitted through the network device in each of the timing periods in a continual timing period is less than a predetermined traffic threshold, and defining a first analysis result every time that the traffic transmitted through the network device in each of the timing periods in the continual timing period is less than the predetermined traffic threshold;
   a counting module configured for counting an amount of the first analysis results defined by the traffic analysis module, and configured for determining if the counted amount is less than a predetermined threshold;
   a mode switching module configured for switching the working modes of the network device according to the determination of the counting module; and
   at least one processor for executing the timing module, the traffic analysis module, the counting module, and the mode switching module.

2. The network device as claimed in claim 1, further comprising a mode determining module configured for determining the working modes of the network device.

3. The network device as claimed in claim 2, wherein the mode switching module is configured for switching the working mode of the network device to a sleep mode when the counted amount determined by the counting module is not less than the predetermined threshold, and upon the condition that the mode determining module determines that the network device is in a normal working mode.

4. The network device as claimed in claim 2, wherein the mode switching module is configured for switching the working mode of the network device to a normal working mode when the traffic transmitted by the network device in any one of the timing periods is more than the predetermined traffic threshold and the mode determining module determines the network device is not in the normal working mode.

5. The network device as claimed in claim 4, wherein the counting module is configured for incrementing the counted amount by one, when the counting module receives the first analysis result.

6. The network device as claimed in claim 5, wherein the counting module is configured for resetting the counted amount once the traffic transmitted through the network device in any of the timing periods in the continual timing period is more than the predetermined traffic threshold.

7. The network device as claimed in claim 6, wherein the counting module is configured for resetting the counted amount when the network device is switched to the sleep mode.

8. The network device as claimed in claim 1, wherein the network device is an Asymmetric Digital Subscriber Line (ADSL) device.

9. A method for switching working modes according to traffic transmitted through the network device, the method comprising:
   setting a plurality of timing periods;
   determining if the traffic transmitted through the network device in each of the timing periods in a continual timing period is less than a predetermined traffic threshold, and defining one first analysis result every time that the traffic transmitted through the network device in each of the timing periods in the continual timing period is less than the predetermined traffic threshold;
   incrementing a traffic estimation amount indicating an amount of the first analysis results by one upon the condition that the first analysis result is received;
   determining if the network device is in a sleep mode according to electrical energy consumption;
   determining if the traffic estimation amount is less than a predetermined threshold if the network device is not in the sleep mode; and
   switching the network device to the sleep mode upon the condition that the traffic estimation amount is not less than the predetermined threshold.

* * * * *